United States Patent [19]

Brown et al.

[11] Patent Number: 4,668,486

[45] Date of Patent: May 26, 1987

[54] METHOD FOR REMOVING ORGANIC SUBSTANCES FROM CAUSTIC ALUMINATE LIQUORS

[75] Inventors: Neil Brown, Bonn; Gerhard Kudermann, Alfter; Manfred Fuchs, Bornheim, all of Fed. Rep. of Germany

[73] Assignee: Vereinigte Aluminium-Werke Atkiengesellschaft, Fed. Rep. of Germany

[21] Appl. No.: 847,634

[22] Filed: Apr. 3, 1986

[30] Foreign Application Priority Data

Apr. 4, 1985 [DE] Fed. Rep. of Germany ....... 3512404

[51] Int. Cl.[4] ............................................. C01F 7/06
[52] U.S. Cl. ................................... 423/130; 423/121; 423/122
[58] Field of Search ..................... 423/121, 122, 130

[56] References Cited

U.S. PATENT DOCUMENTS

| | | |
|---|---|---|
| 4,046,855 | 9/1977 | Sehepers et al. ..................... 423/130 |
| 4,101,629 | 7/1978 | Mercier ............................... 423/130 |
| 4,215,094 | 7/1980 | Inao et al. ........................... 423/130 |
| 4,263,261 | 4/1981 | Yamada et al. ..................... 423/130 |
| 4,280,987 | 7/1981 | Yamada et al. ..................... 423/130 |
| 4,581,208 | 4/1986 | The et al. ............................ 423/130 |

Primary Examiner—H. T. Carter
Attorney, Agent, or Firm—Darby & Darby

[57] ABSTRACT

The present invention is directed to a method for removing organic substances from aluminate liquors of the Bayer process. The method comprises the steps of contacting the liquor with an oxygen containing gas under elevated pressure in the presence of metallic ions acting as a catalyst to oxidize the organic substances, precipitating the metallic ions jointly with aluminum hydroxide, separating the precipitate from the oxidized liquor and recycling the precipitated aluminum hydroxide containing the metallic ions into the oxidation step as a catalyst carrier.

15 Claims, 3 Drawing Figures

FLOW DIAGRAM (COPPER-BOEHMITE)

FIG. 2 FLOW DIAGRAM (COPPER-BOEHMITE)

METHOD FOR REMOVING ORGANIC SUBSTANCES FROM CAUSTIC ALUMINATE LIQUORS

FIELD OF THE INVENTION

The present invention relates to a method for removing organic substances from the caustic aluminate liquors of the Bayer process for the production of alumina from bauxite.

BACKGROUND OF THE INVENTION

The well-known Bayer process is widely used for the production of alumina from alumina-containing ores such as bauxite. In this process, alumina-containing ores are contacted with recycled caustic aluminate liquor at elevated temperatures. This produces a slurry of material which comprises dissolved (alumina-containing) and undissolved red mud (iron oxides, silicates, titanium oxide, etc.) components. The undissolved residues are removed, the liquor cooled and aluminum hydroxide is added to the remaining clear solution (which is known as "pregnant liquor"). The added aluminum hydroxide acts as a seed for the further precipitation of aluminum hydroxide in this solution. The precipitated aluminum hydroxide is then separated from the caustic aluminate solution. A portion of the aluminum hydroxide is recycled to be used as a seeding agent for further precipitation of aluminum hydroxide and the remainder is recovered as product. The remaining caustic aluminate solution (hereinafter referred to as "spent liquor") is recycled in the process for further alumina recovery as it is, or is evaporated prior to the first extraction step.

The bauxite used in the Bayer process contains organic substances which wholly or partly dissolve during the bauxite digestion step. Under the influence of the high caustic concentration and elevated temperatures during bauxite digestion, the organic contaminants degrade to lower molecular weight compounds. In the Bayer liquor, therefore, the organic contaminants comprise a wide spectrum of molecules ranging from complex high molecular weight compounds to final degradation products, such as sodium oxalate and sodium carbonate.

The organic contaminants of the Bayer process inhibit the precipitation of aluminum hydroxide, reduce liquor productivity and generally lower the purity of the produced alumina. Therefore, it is necessary to lower the organic carbon concentration of the Bayer plant liquor. This can be accomplished by accelerating the oxidizion of the organic carbon contaminant of the liquor to the final products sodium oxalate or, preferably, sodium carbonate.

A method for this purpose is known from U.S. Pat. No. 4,215,094 to Inao, et al., which uses temperatures up to 300° C. and copper ions (in the form of cupric sulfate) of at least 100 mg/l as well as oxygen in at least stoichiometric quantities required to oxidize the organic contaminants of the Bayer liquor. Sodium sulfide is used to precipitate and recover the copper ions from oxidized liquor as copper sulfide. However, the copper sulfide thus precipitated is not easy to separate by filtration for recycling.

In this prior art, it is claimed that if the organics oxidation efficiency is limited to 60-85%, whereby a sufficient concentration of crystalline sodium oxalate is maintained in the oxidized liquor, the sodium oxalate-copper sulfide mixture is filterable. In order to recycle the catalyst, however, the sodium oxalate crystals must be removed in a second oxidation step.

Furthermore, unless a considerable excess of $Na_2S$ is used to precipitate copper sulfide, copper ions remain in solution and can enter the Bayer process liquor and contaminate the product alumina. Sulfate ions are also introduced in significant amounts unless preventive measures are taken to remove them.

Therefore, what is needed in the art is an improved method for the oxidative degradation of organic carbon contaminants in Bayer liquors whereby oxidation efficiencies of greater than 85% can be achieved without the above-mentioned difficulties in filtration and without the introduction of sulfate ions into the works liquor.

The present inventors have discovered a new method for achieving the aforementioned objective. This is done by contacting the caustic aluminate liquor, which contains the organic substances, with molecular oxygen-containing gas at elevated pressure and in the presence of metallic ions acting as catalysts. This produces a substantially complete oxidation of the organic carbon to sodium carbonate. The oxidative degradation of organic substances leads to a lower organic soda concentration in the Bayer liquor and, therefore, a reduced soda and organic carbon concentration in the product alumina. Moreover, it is well known that the removal of said organic contaminants leads to a substantial improvement in the alumina yield.

OBJECTS OF THE INVENTION

Figure 1:
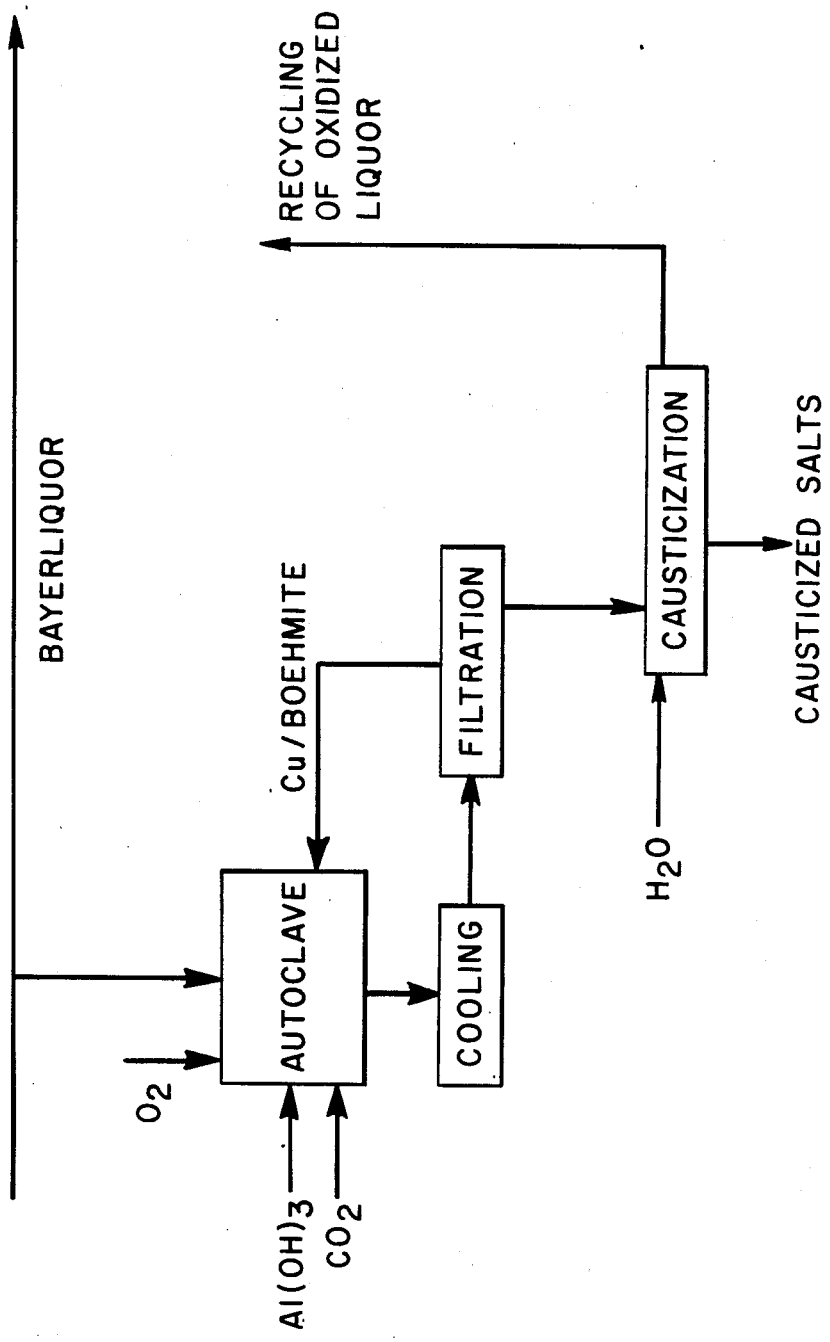
FIG. 1 is a schematic flow diagram describing one embodiment of the present invention using Cu/boehmite* as the catalyst recovery system.
*Shortened form for "copper-containing boehmite"

The present invention has several objects including, but not limited to, the following:

to provide an improved method for removing organic substances from caustic aluminate liquors of the Bayer process;

to provide a method for removing organic substances from caustic aluminate liquors of the Bayer process in such a way that oxidation efficiencies of greater than 85% may be achieved without filtration difficulties;

to provide a method for removing organic substances from caustic aluminate liquors of the Bayer process so that no contamination of the main liquor circuit occurs.

These and other objects of the present invention will be apparent to those skilled in the art in light of the present description, accompanying claims and appended drawings.

SUMMARY OF THE INVENTION

The present invention is directed to a process for removing organic substances from aluminate liquors of the Bayer process comprising the steps of contacting said liquor with an oxygen-containing gas under elevated pressure in the presence of metallic ions acting as catalyst to oxidize said organic substances;

precipitating said metallic ions jointly with aluminum hydroxide;

separating the precipitate from the oxidized liquor; and recycling the precipitated aluminum hydroxide containing the metallic ions into the oxidation step to act as a catalyst carrier.

DETAILED DESCRIPTION OF THE INVENTION

The present invention describes an oxidation method whereby metallic ions can be used as catalysts while avoiding the difficulties associated with the filtration of copper sulfide supported by sodium oxalate and the disadvantages of the cooling of the liquor.

Thus, it has been found that when the catalyst of the present invention is used in amounts of 1-5000 mg/l, but optimally about 500 mg/l, it can be removed from the oxidized liquor to less than 1 mg/l, as coprecipitate with aluminum monohydrate (boehmite).

The crystalline coprecipitate (Cu/boehmite) can be readily filtered and recycled, thereby acting as carrier for the catalyst. Consequently, organics oxidation efficiencies of greater than 85% may be pursued and a more complete oxidation of organics to sodium carbonate realized.

A preferred embodiment of the present invention is to be seen in the use of copper ions as catalyst and in the conditions of precipitation which ensure that aluminum monohydrate (boehmite) is precipitated.

The sequence of steps assocaited with the use of Cu/boehmite is as follows. A part of the liquor from the main process is split off as a side stream. To this liquor-to-be-oxidized, the recycled Cu/boehmite crystalline material is added. Upon heating the side stream to the reaction temperature in the presence of an amount of oxygen gas necessary to oxidize the amount of organic substances present, the Cu/boehmite dissolves and releases the copper ions into solution to act as oxidation catalysts for the organic species present in the liquor. The combined effects of organic carbonation of the oxidized liquor and of the lowering of the temperature at the end of the oxidation reaction induces autoprecipitation of Cu/boehmite in the autoclave. On further cooling to 95° C., and under atmospheric pressure, the Cu/boehmite is separated and recycled.

Copper sulfate and copper sulfide may be used as precipitating agents in accordance with the prior art. However, it has been found advantageous to begin with copper oxide or copper hydroxide since neither of these introduce the undesirable sulfate anion into oxidized liquor. Copper oxide is, in fact, the common catalytic agent irrespective if one starts with copper sulfate, copper sulfide or copper hydroxide. All three compounds react immediately with the Bayer liquor at temperatures below 100° C. and form a black precipitate of copper oxide. Subsequently, at the organics oxidation reaction temperature of, for example, 300° C. (and 40 bar $O_2$), the copper oxide dissolves and exerts its catalytic effect.

The oxidation/reduction behavior of the copper ions ($Cu^{2+}$ and $Cu^+$) are believed to be responsible for the catalytic oxidative degradation of the organic carbon compounds of the Bayer liquor. Indeed, the present inventors have isolated both $Cu_2O$ and $CuO$ as reaction intermediates in partially oxidized Bayer liquors.

The basis of the invention lies in the fact that the alumina concentration of the oxidized liquor can exceed the critical supersaturation with respect to boehmite under elevated pressure above 120° C., and with respect to bayerite under atmospheric pressure below 120° C., due to the organic carbonation and simultaneous lowering of the free caustic concentration of the liquor.

In a well-oxidized liquor, the starting alumina and organic carbon concentrations are important parameters in determining whether or not Cu/boehmite autoprecipitates in the reaction autoclave. It has been found that the following critical cohdition in the oxidized liquor must be attained in order to ensure the formation of Cu/boehmite after organics oxidation in the autoclave at elevated temperatures (K=molar ratio):

$$K = \frac{Na_2O_{free}}{Al_2O_3} \leq 1$$

As the concentration of organics in the process liquor is progressively reduced, the conversion of free caustic is also reduced since there is less organic carbonation of the oxidized liquor.

Assuming a constant degree of oxidation, e.g. 90%, then the obtainable molar ratio ($Na_2O_{free}$ to $Al_2O_3$) will increase progressively as the organic carbon concentration of the works liquor decreases.

If the organic carbon concentration is reduced under a value of approx. 12 g/l, the molar ratio may rise above 1. At this point the critical requirement for Cu/boehmite formation must be prearranged.

This can be done in two ways:

Either the alumina content can be raised by adding the requisite amount of solid aluminum trihydroxide along with the recycled Cu/boehmite, or the $Na_2O_{free}$-content can be reduced by the introduction of an appropriate amount of $CO_2$-gas to the liquor-to-be-oxidized. Also, moderate increases of the reaction temperature and of the amount of oxygen used can lower the K-value below 1, and thus ensure the formation of Cu/boehmite.

If for any reason, the Cu/boehmite does not precipitate in the autoclave, then the copper ions still remain in the oxidized liquor. In this case, precipitation of aluminum trihydroxide can be induced in order to remove the copper from the oxidized liquor, preferably by means of the introduction of a relatively small amount of $CO_2$ at 95° C. under atmospheric pressure, which stimulates the crystallization of copper-containing bayerite.

The precipitate is removed from the oxidized liquor via filtration. When Cu/boehmite is used as the catalyst recovery system, the procedure is as follows: Directly after organics oxidation, the autoclave is cooled to approx. 95° C., opened, and the contents immediately filtered (in the lab, under vacuum; on an industrial scale, under applied pressure). This is followed by a hot water wash on the filter or, alternatively, the Cu/boehmite precipitate is resuspended in hot water and again filtered. The filter cake can be recycled as a damp cake or it can be dried first.

When the Cu/bayerite recovery system is used, the liquor from the autoclave is usually solids-free. It is cooled to 95° C. and injected with $CO_2$, until a blue Cu/bayerite precipitate begins to crystallize. All of the copper crystalizes with the initial precipitate. This is then filtered and treated as described above for the Cu/boehmite recovery system.

Figure 2:
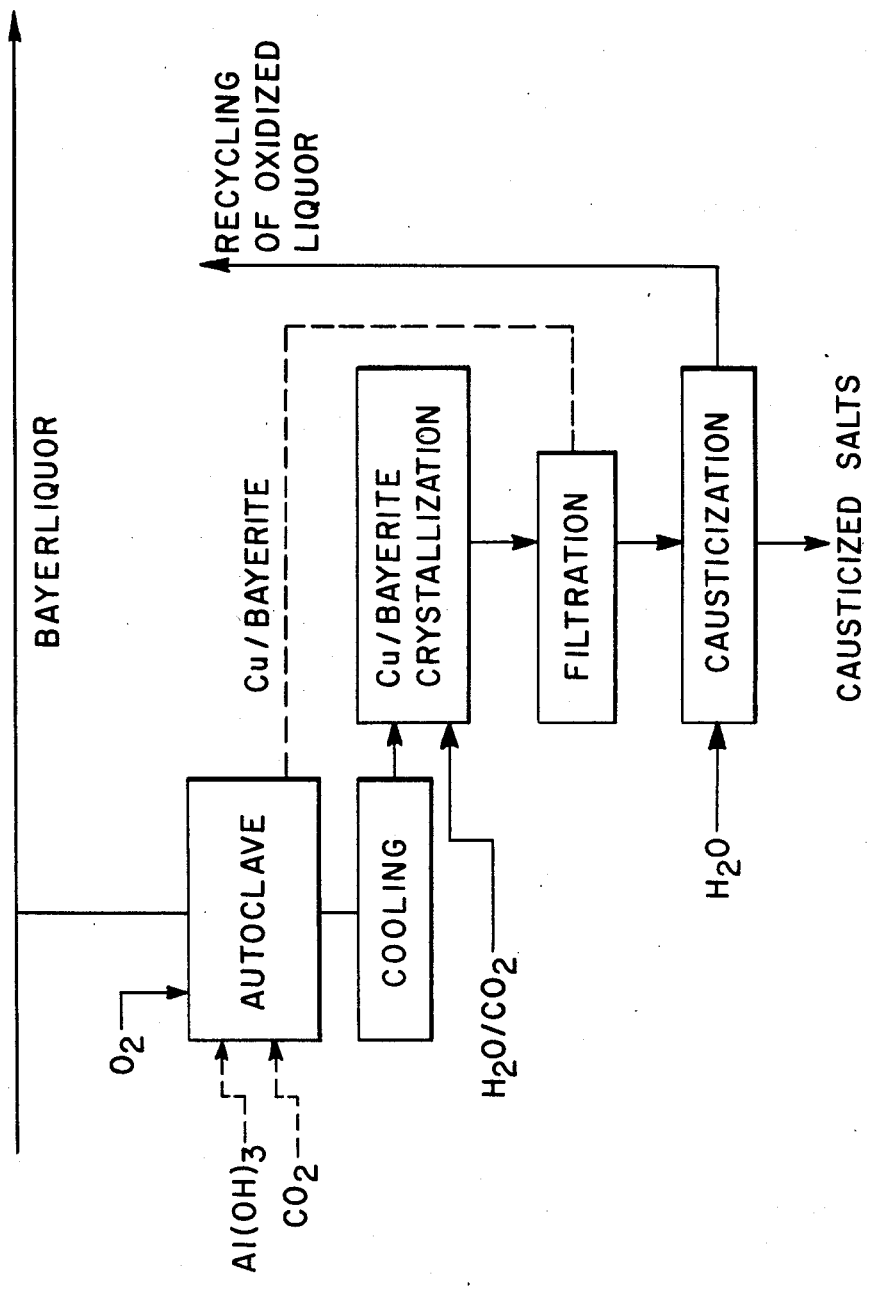
FIG. 2 is a schematic flow diagram describing an alternative embodiment of the present invention using Cu/bayerite** as the catalyst recovery system.
**Shortened form for "copper-containing bayerite"

The method of the present invention can be illustrated more specifically with reference to the FIGS. 1 and 2.

FIG. 1 shows a schematic diagram of a side-stream of the main Bayer process circuit. It contains the wet oxidation and catalyst recovery steps of the present invention. Introduced into the wet oxidation step is a side-stream of the main circulating caustic aluminate liquor of the Bayer process. This can be any suitable liquor but typically would be spent liquor or "pregnant" liquor or "evaporated" liquor or a mixture thereof. Thus, liquor is brought into contact with oxygen gas supplied in an amount at least equal to that theoretically required to oxidize-decompose the organic substances in the liquor, at a predetermined pressure and temperature in the presence of copper ions introduced via the recycled Cu/boehmite.

The contact time in the reactor depends upon the temperature but optimally is within a 10–60 min. range. The organic substances in the liquor thus treated are oxidized and the liquor cooled and separated from the Cu/boehmite coprecipitate at approx. 95° C. The Cu/boehmite is recycled to the wet oxidation step while the oxidized liquor which is now high in sodium carbonate is introduced into a causticization step. The oxidized liquor is diluted to a $Na_2O$ concentration of not more than 60 g/l and reacted with lime to convert the sodium carbonate to sodium hydroxide and calcium carbonate. The precipitated calcium salts are removed from the causticized liquor which is recycled to the main Bayer process.

FIG. 2 shows an alternative wet oxidation process, in that Cu/bayerite is the catalyst recovery system. The introduction of a relatively small amount of $CO_2$ under atmospheric pressure at approx. 95° C. stimulates the crystallization of Cu/bayerite, which is filtered and recycled to the wet oxidation step.

In the flow-sheets of FIGS. 1 and 2, the present invention is shown in the form of a continuous process which is preferred, but the present invention may be operated in either batch process or semi-continuous process.

Next, the present invention will be described further below with reference to the following examples, which are intended to illustrate it without limiting its scope.

EXAMPLE 1

30 ml of a works spent liquor (composition: $Na_2O_{free}$ approx. 140 g/l; $Al_2O_3$, approx. 80 g/l; organic carbon, approx. 26.5 g/l) from the Bayer process was introduced into a 100 ml stainless steel autoclave and kept at a temperature of 300° C. for 20 min. under an oxygen pressure of 40 bar (measured at 25° C.) and in the presence of 500 mg/l Cu, added as $CuSO_4.5H_2O$.

Thereafter the oxidized liquor was cooled to approx. 95° C. and the Cu/boehmite precipitate was separated by filtration. The organic carbon concentration of the oxidized liquor was 5 g/l, showing that the efficiency of oxidation was 81%. The weight of the Cu/boehmite precipitate was equivalent to 40 g/l alumina, while the concentration of copper in the liquor was less than 1 mg/l. (The $Na_2O_{free}$-concentration of the oxidized liquor was 32.5 g/l, indicating K=0.67 at the end of the oxidation.)

Using a fresh 30 ml aliquot of spent liquor, the aforementioned experiment was repeated six times without any further addition of copper, but using only the entire amount of the Cu/boehmite precipitated at the end of each cycle as the source of copper ions. After the sixth oxidation experiment, the organic carbon concentration of the oxidized liquor was still of the order of 5 g/l indicating that the efficiency of oxidation had been maintained. The average amount of Cu/boehmite precipitated per cycle was 38 g/l (as alumina).

The copper content of the sixth oxidized liquor was less than 1 mg/l, while there was no significant increase in the sulfate concentration.

EXAMPLE 2

Spent liquor having the same composition as in Example 1 was diluted to 19.6 g/l of organic carbon using a synthetic liquor of the same composition but free of organic carbon.

30 ml of the aformentioned diluted spent liquor, i.e. with respect to organic carbon, was oxidized in the same way as described in Example 1. The organic carbon content of the oxidized liquor was 2 g/l, i.e. oxidation efficiency was 90%. Despite the high organics oxidation efficiency, there was no Cu/boehmite precipitate formed. $Na_2O_{free}$-concentration of the oxidized liquor was 52 g/l, (K=1.07).

The above experiment was then repeated using a fresh 30 ml aliquot of the diluted spent liquor, i.e. with respect to organic carbon, but this time 56 g/l of alumina as $Al(OH)_3$, was added. After organics oxidation of the liquor and cooling to 95° C., a Cu/boehmite precipitate was present in an amount of 40 g/l, while the organics concentration of the oxidized liquor was 3 g/l, i.e. an oxidation efficiency of 85%. The $Na_2O_{free}$-concentration of the oxidized liquor was 57 g/l (K=0.69).

The copper content of the oxidized liquor was less than 1 mg/l, while the sulfate concentration increased by 0.75 g/l, i.e. the entire sulfate content of the $CuSO_4.5H_2O$ remained dissolved in the oxidized liquor. The copper had coprecipitated with the beohmite quantitatively, and the copper content of the oxidized liquor was less than 1 mg/l.

EXAMPLE 3

Spent liquor having the same composition as that in Example 1 was diluted to 9.6 g/l organic carbon using a synthetic liquor of the same composition but free of organic carbon.

30 ml of the aforementioned diluted spent liquor, i.e. diluted with respect to organic carbon, was oxidized in the same way as described in Example 1. The organic carbon content of the oxidized liquor was 1.2 g/l, i.e. an oxidation efficiency of 88%. However, under these experimental conditions, no Cu/boehmite had formed. The $Na_2O_{free}$-concentration of the oxidized liquor was 98 g/l (K=2.02).

The experiment was then repeated using a fresh 30 ml aliquot of the diluted spent liquor, but this time 143 g/l alumina (as $Al(OH)_3$) was supplied as an additional source of alumina. After organics oxidation and cooling to a temperature of 95° C., a Cu/boehmite coprecipitate was present in a amount of 80 g/l (as alumina). The organic carbon concentration of the oxidized liquor was 1.7 g/l, i.e. an oxidation efficiency of 82%. The $Na_2O_{free}$-concentration of the oxidized liquor was 100.5 g/l (K=0.74).

EXAMPLE 4

30 ml of a works pregnant liquor (composition: $Na_2O_{free}$, approx. 122.9 g/l; $Al_2O_3$, approx. 144.2 g/l; organic carbon, approx. 9.7 g/l) from the Bayer process was introduced into a 100 ml stainless steel autoclave and oxidized under the same conditions as described in Example 1.

The organic carbon concentration of the oxidized liquor was 1.3 g/l, i.e. the oxidation efficiency was 87%. The $Na_2O_{free}$-concentration of the oxidized liquor was 80.4 g/l. The presence of Cu/boehmite in the oxidized liquor was consistent with the value of K=0.92.

The copper content of the oxidized liquor was less than 1 mg/l.

EXAMPLE 5

30 ml of another works pregnant liquor (composition: $Na_2O_{free}$, approx. 141.0 g/l; $Al_2O_3$, approx. 138.1 g/l; organic carbon, approx. 17.9 g/l) was introduced into a 100 ml stainless steel autoclave and oxidized under the same conditions as described in Example 2 except that this time the source of 500 mg/l copper was CuO.

The organic carbon concentration of the oxidized liquor was 2.5 g/l, i.e. the oxidation efficiency was 86%. The $Na_2O_{free}$-concentration of the oxidized liquor was 64.1 g/l. The presence of a Cu/boehmite precipitate was consistent with the value of K=0.76.

The copper content of the oxidized liquor was less than 1 mg/l.

EXAMPLE 6

30 ml of a partially evaporated works spent liquor (composition: $Na_2O_{free}$, approx. 168.8 g/l; $Al_2O_3$, approx. 94.9 g/l; organic carbon, approx. 17.7 g/l) was introduced into a stainless steel autoclave of 100 ml and oxidized under the same conditions as described in Example 1.

The organic carbon concentration of the oxidized liquor was 0.45 g/l, i.e. the oxidation efficiency was 95% and the $Na_2O_{free}$-concentration of the oxidized liquor was 88.3 g/l at the end of the oxidation. However, there was no Cu/boehmite at the end of the oxidation, consistent with the value of K=1.53.

The above experiment was then repeated using a fresh 30 ml aliquot of the partially evaporated works spent liquor, but this time $CO_2$-gas was bubbled through the liquor at a temperature of about 75° C. prior to organics oxidation. Thus, the anticipated value of K after oxidation was lowered to approx. 1.1 by lowering the $Na_2O_{free}$-concentration of the starting liquor-to-be-oxidized to 129.1 g/l.

The organic carbon concentration of the oxidized liquor was 1.2 g/l, i.e. oxidation efficiency was 93% and the $Na_2O_{free}$-concentration was 61.0 g/l (K=1.06). There was, as expected, no Cu/boehmite present in the oxidized liquor.

The oxidized liquor was blue in color indicating that the copper ions remained in solution. By introduction of a relatively small amount of $CO_2$-gas into this liquor at a temperature of 95° C. and under conditions of atmospheric pressure, Cu/bayerite crystallized. All copper ions were removed from the oxidized liquor by coprecipitating with the bayerite. The remaining liquor was colorless and clear.

The crystalline copper-containing bayerite was filterable and could be recycled and used again as catalyst. The Cu/bayerite crystallized in an amount corresponding to 19 g/l alumina.

The above-described experiment was repeated with the total amount of the precipitated Cu/bayerite without addition of copper. This time the $Na_2O_{free}$-concentration was reduced to 136.1 g/l by $CO_2$-gassing at 75° C. After oxidation, the organic carbon concentration of the liquor was 1.6 g/l, i.e. oxidation efficiency was 95% and the $Na_2O_{free}$-concentration of the oxidized liquor 64.2 g/l. Cu/boehmite was present, fully consistent with the value of K=0.93.

The examples show that the coprecipitation of Cu/boehmite can be achieved in the face of a decreasing organic carbon concentration by raising the alumina content and/or lowering the $Na_2O_{free}$-concentration of the liquor-to-be-oxidized.

The use of $Al(OH)_3$ additions as described in Examples 2 and 3 is intended primarily to demonstrate this mode of supplying additional alumina, and also the advantageous situation whereby, the Cu/boehmite that coprecipitates after organics oxidation is always less, in terms of alumina content, than the amount of alumina required to ensure continued coprecipitation of Cu/boehmite at the end of subsequent oxidation cycles. There is therefore no accumulation of Cu/boehmite.

Example 6 demonstrates that, under circumstances where Cu/boehmite fails to crystallize out of the oxidized liquor in the autoclave, the copper ions can still be recovered as Cu/bayerite under conditions of atmospheric pressure. Bayerite does not have the same efficiency of crystallization as boehmite. However, it is filterable, so that there exists, if needed, a further easy-to-handle catalyst recycling system.

In all 6 examples described, there was no interference from solid sodium oxalate since its concentration in oxidized liquor is always so low as to preclude its crystallization under the given experimental conditions used for filtering Cu/boehmite and Cu/bayerite.

Figure 3:
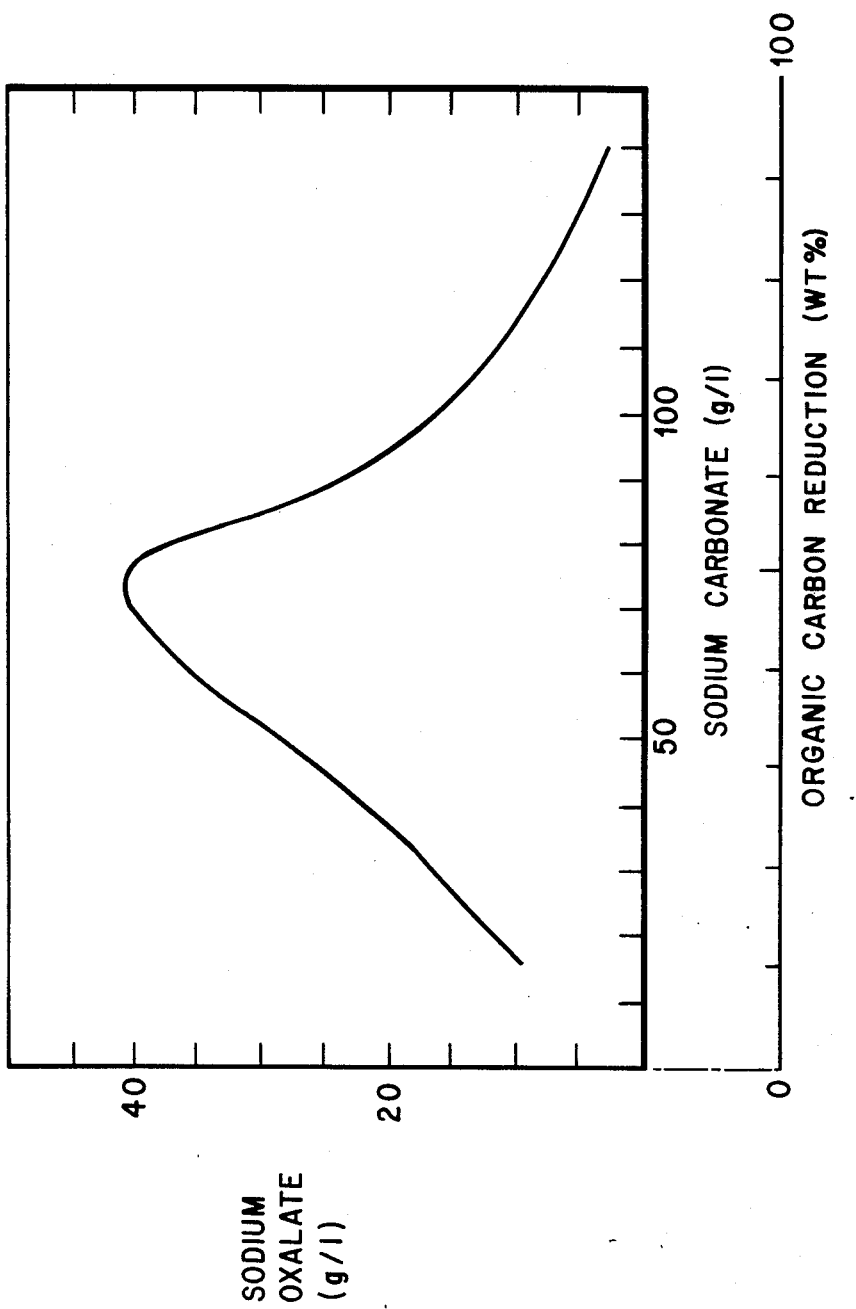
FIG. 3 is a graph depicting the changes in sodium oxalate and sodium carbonate concentrations during the oxidation of a caustic aluminate liquor in accordance with the present invention.

The oxidation reaction path goes via sodium oxalate to sodium carbonate as well as directly to sodium carbonate, i.e. there exists a dynamic relationship between the formation and removal of sodium oxalate during the oxidation of the organic carbon in the liquor. A summary of the experimental data shows that the sodium oxalate concentration can increase to approx. 40 g/l during organics oxidation (see FIG. 3). In order to ensure that in the oxidized liquor less sodium oxalate is present than in the starting liquor, an organics conversion to sodium carbonate of more than 80% is necessary.

In comparison with the use of copper sulfide as a recycling catalyst, the use of Cu/boehmite and Cu/bayerite is superior in that (a) higher organic carbon conversion to sodium carbonate can be achieved since restrictions in oxidation conditions are not necessary nor desirable;

(b) only one oxidation step is necessary since crystalline sodium oxalate plays no part in the recovery system;

(c) the copper catalyst is quantitatively recovered from the oxidized liquor within the autoclave itself during the normal holding period at elevated temperatures and pressures;

(d) only lime causticization of sodium carbonate is necessary before returning the oxidized liquor to the main Bayer process;

(e) the liquor for this causticization has an optimum temperature.

Consequently, the method of the present invention has large scale industrial benefits.

The invention has been described above by reference to preferred embodiments. It is understood, however, that many additions, deletions and modifications will be apparent to one of ordinary skill in the art in light of the present description without departing from the scope of the invention, as claimed below.

What is claimed is:

1. A process for removing organic carbon substances from caustic aluminate liquors of the Bayer process comprising the steps of:
    contacting said liquor containing said carbon substances with at least enough molecular oxygen-containing gas to oxidize said organic carbon substances;
    oxidizing said liquor in the presence of copper ions until a molar ratio of $Na_2O$ to $Al_2O_3$ of no more than 1.0 is achieved;
    converting more than 85% of said organic carbon substances to sodium carbonate;
    precipitating said copper ions jointly with bohemite by the addition of aluminum hydroxide;
    separating said precipitate from the oxidized liquor by filtration; and
    recycling the precipitated aluminum hydroxide-containing copper ions to the oxidation step.

2. A process according to claim 1 which comprises precipitating the aluminum hydroxide as a bohemite under a oxygen pressure of 40 bar at temperatures above 120° C. and recycling said precipitated bohemite as a catalyst carrier.

3. A process according to claim 1 which comprises precipitating said copper ions with bayerite under conditions of atmospheric pressure and temperatures less than 120° C.,
    separating said precipitated copper containing bayerite by filtration, and recycling the copper-containing bayerite as a catalyst carrier.

4. A process according to claim 3 which comprises diluting the oxidized liquor after separation of the copper-containing bayerite and treatment of said liquor with lime prior to reintroduction of said liquor into the main circuit of the Bayer process.

5. A process according to claim 1 which comprises adding aluminum or aluminum-containing compounds to the recycled copper-containing bohemite.

6. A process according to claim 1 which comprises adding carbon dioxide gas to said caustic aluminate liquor prior to said oxidizing step to induce the precipitation of copper-containing bohemite or bayerite from said liquor.

7. A process according to claim 1 wherein the caustic aluminate liquor is a member selected from the group consisting of pregnant liquor, spent liquor, mud washing liquor or mixtures thereof.

8. A process according to claim 1 which comprises carrying out said oxidation in a side-stream of the Bayer process liquor circuit.

9. A process according to claim 1 which comprises
    diluting the oxidized liquor after separation of the copper containing bohemite, and
    adding lime to said liquor prior to reintroducing said liquor into the main circuit of the Bayer process.

10. A process according to claim 1 wherein the sodium oxalate concentration of said caustic aluminate liquor approaches a maximum value of approximately 40 grams per liter during said oxidation.

11. A process for decontaminating Bayer process liquors which comprises
    contacting a Bayer process liquor containing carbon contaminants with an oxygen containing gas,
    conducting said contacting step at a predetermined temperature and at a predetermined pressure and in the presence of copper ions,
    continuing said contacting step until the molar ratio of $Na_2O$ to $Al_2O_3$ is at or below 1.0,
    adding aluminum hydroxide to said liquor to form a precipitate,
    separating said precipitate from the oxidized liquor and
    recycling the precipitate to the contacting step,
    whereby more than 85% of said organic contaminants are converted to sodium carbonate and remain in said liquor.

12. The process of claim 11 wherein said predetermined pressure during said contacting step is approximately 40 bar.

13. The process of claim 11 wherein said predetermined temperature during said contacting step is between the range of 120° C. and 300° C.

14. The process of claim 11 which comprises conducting said contacting step for between about 10 and about 60 minutes.

15. The process of claim 11 wherein said precipitate comprises bohemite and copper ions.

* * * * *